(12) United States Patent
Curto et al.

(10) Patent No.: US 6,311,107 B1
(45) Date of Patent: Oct. 30, 2001

(54) WIND ADVISORY SYSTEM

(75) Inventors: Paul A. Curto, Potomac, MD (US); Gerald E. Brown, McLean, VA (US); Jan A. Zysko, Merritt Island, FL (US)

(73) Assignee: The United States of America as represented by the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/606,102

(22) Filed: Jun. 23, 2000

(51) Int. Cl.$^7$ ...................................................... G06F 19/00
(52) U.S. Cl. .............................. 701/14; 701/3; 340/949; 340/601
(58) Field of Search ..................... 701/3, 14, 15, 701/16, 202; 340/947, 949, 972, 601; 73/178 T

(56) References Cited

U.S. PATENT DOCUMENTS

| | | | |
|---|---|---|---|
| 4,295,139 | * 10/1981 | Arpino | 340/949 |
| 4,318,076 | * 3/1982 | Whitfield | 73/178 T |
| 4,642,775 | * 2/1987 | Cline et al. | 701/202 |
| 6,154,143 | * 11/2000 | Robinson | 701/14 |
| 6,199,008 | * 3/2001 | Aratow et al. | 701/14 |

\* cited by examiner

*Primary Examiner*—Gary Chin
(74) *Attorney, Agent, or Firm*—John H. Kusmiss

(57) ABSTRACT

The present invention is a two-part wind advisory system comprising a ground station at an airfield and an airborne unit placed inside an aircraft. The ground station monitors wind conditions (wind speed, wind direction, and wind gust) at the airfield and transmits the wind conditions and an airfield ID to the airborne unit. The airborne unit identifies the airfield by comparing the received airfield ID with airfield IDs stored in a database. The airborne unit also calculates the headwind and crosswind for each runway in both directions at the airfield using the received wind conditions and runway information stored in the database. The airborne unit then determines a recommended runway for takeoff and landing operations of the aircraft based on the runway having the greatest headwind value and displays the airfield ID, wind conditions, and recommended runway to the pilot. Another embodiment of the present invention includes a wireless internet based airborne unit in which the airborne unit can receive the wind conditions from the ground station over the internet.

15 Claims, 3 Drawing Sheets

WIND ADVISORY SYSTEM

ORIGIN OF THE INVENTION

The invention described herein was made by employees of the United States Government and may be manufactured and used by or for the Government for governmental purposes without the payment of any royalties thereon or therefor.

TECHNICAL FIELD

The present invention is directed to a wind advisory system comprising a ground station for monitoring and transmitting wind conditions at an airfield and an airborne unit inside an aircraft for receiving the wind conditions and displaying the wind conditions and a recommended runway to the pilot.

BACKGROUND ART

Wind conditions, including wind speed and wind direction, are currently collected at airfields and transmitted to pilots via a voice recording on a dedicated automatic terminal information service (ATIS) frequency or an Automated Surface Observation System (ASOS). A problem with ATIS and ASOS is that the pilot must change the frequency of his on-board radio to the ATIS or ASOS frequency in order to hear the information. This is especially undesirable when a pilot is on approach to a controlled airfield and must monitor the air traffic controller frequency (ATC) to receive instructions from the air traffic controller. The aural wind condition information from ATIS and ASOS must be either memorized or written down by the pilot. It is not conveniently displayed in the cockpit for easy reference. If the pilot has two radios and can tune one to the ATIS or ASOS frequency and listen to the ATC controller with the other, there is still the difficulty of listening to two different sets of instructions at once. This increases the probability that the pilot will misunderstand or completely miss critical clearances or instructions from the ATC controller.

Therefore, there is a need for an airborne unit that automatically receives wind conditions at an airfield and displays the wind conditions to the pilot in the cockpit for easy reference. Furthermore, it is desirable for the airborne unit to process the received wind conditions to provide additional information to the pilot that can aid him in the takeoff and landing operations of the aircraft. This is especially useful when the aircraft is taking off from or landing at a noncontrolled airfield.

STATEMENT OF THE INVENTION

The present invention is a wind advisory system comprising a ground station and a handheld airborne unit inside an aircraft. The airborne unit is a small battery powered unit that can be conveniently placed on the aircraft's instrument deck for easy viewing by the pilot.

The ground station comprises an anemometer, a microprocessor and a transmitter. The anemometer senses the wind conditions (wind speed, wind direction, and wind gust) at the airfield and outputs the wind conditions to the microprocessor. The microprocessor encodes, and reformats the wind conditions. The microprocessor also performs appropriate averaging of wind speed and direction, within a specific period of time, in gusty conditions to determine steady-state wind conditions and peak gust. The transmitter then transmits the wind conditions and an airfield ID to the airborne unit.

The airborne unit comprises a receiver, a microprocessor, a database and a display. The receiver automatically receives the wind conditions and airfield ID. The microprocessor compares the received airfield ID with airfield IDs stored in the database to identify the airfield. The microprocessor then uses the received wind conditions and runway information for that airfield ID stored in the database to calculate the headwind and crosswind at each runway in both directions. The microprocessor then determines a recommended runway for take off and landing operations of the aircraft based on the runway having the greatest headwind value. The airfield ID, the wind conditions, and the recommended runway are displayed to the pilot on the display.

BRIEF DESCRIPTION OF THE DRAWINGS

The exact nature of this invention will be readily apparent from consideration of the following detailed description in conjunction with the accompanying drawings, wherein.

DETAILED DESCRIPTION OF THE INVENTION

The following description is provided to enable any person skilled in the art to make and use the invention and sets forth the best modes contemplated by the inventors of carrying out their invention.

Figure 1:
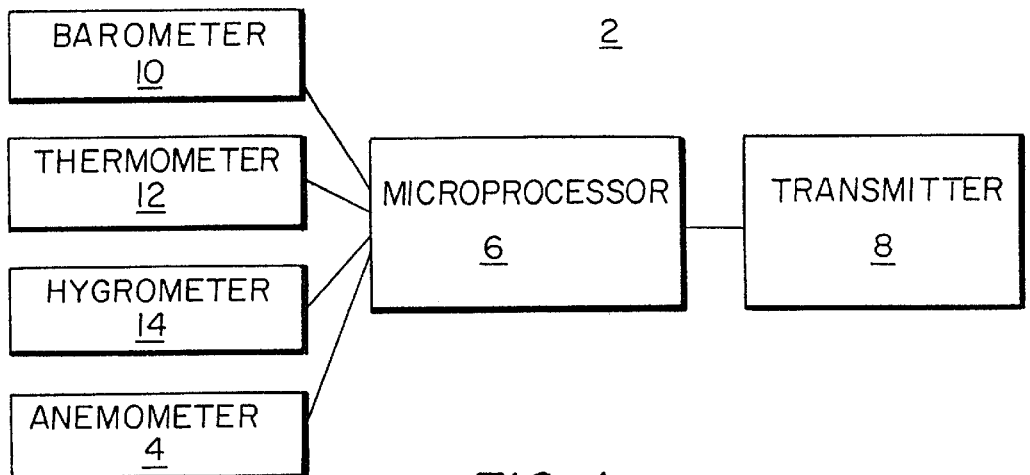
FIG. 1 is a block diagram of the ground station of the wind advisory system according to the present invention.
Figure 2:
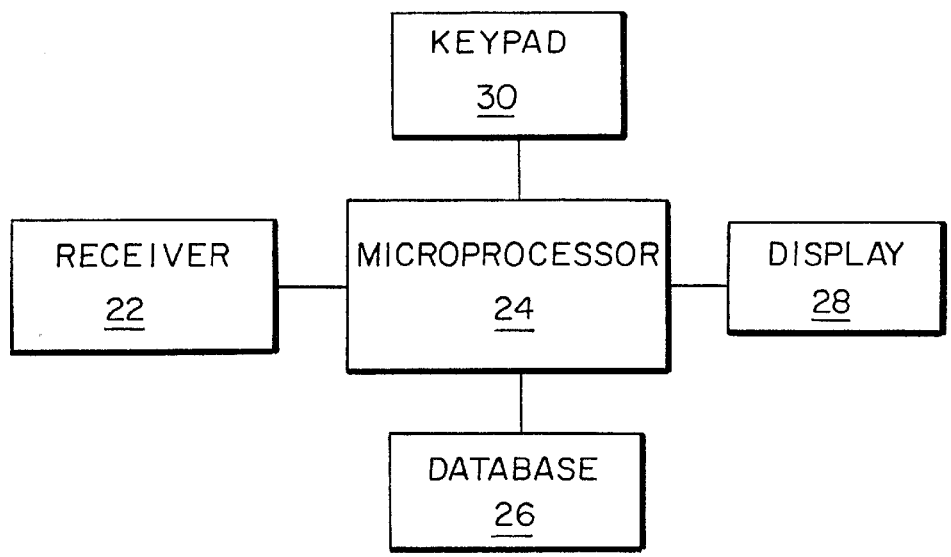
FIG. 2 is a block diagram of the airborne unit of the wind advisory system according to the present invention.

FIGS. 1 and 2 are block diagrams illustrating the wind advisory system of the present invention. The wind advisory system includes a ground station 2 at an airfield and a handheld airborne unit 20 placed inside an aircraft. The ground station 2 monitors surface wind conditions, including wind speed, wind direction, and wind gust, at the airfield and transmits the wind conditions and an airfield ID to the airborne unit 20. The ground station 2 can be battery powered, solar powered with a battery backup or powered by the a/c grid of an airfield. The airborne unit 20 receives the wind conditions from the ground station and displays the airfield ID, wind conditions and a recommended runway to the pilot.

The ground station 2 comprises an anemometer 4, a microprocessor 6 and a transmitter 8. The anemometer 4 senses the wind conditions (wind speed, wind direction, and wind gust) at the airfield and outputs the wind conditions to the microprocessor. The microprocessor 6 continuously monitors the wind speed and direction measurements from the anemometer and averages the wind speed and direction over a specific period of time while recording the peak wind gust in the same period. The microprocessor then encodes, and reformats the averaged wind conditions for transmission. The transmitter 8 continuously transmits the processed wind conditions and an airfield ID to the airborne unit 20, providing continuous real-time updates of the airfield wind conditions. The transmitter 8 is preferably a low power spread spectrum transmitter, such a 1 watt transmitter operating at a frequency of 900 Hz and having a range of 5–10 nautical miles. Even though a spread spectrum transmitter is preferred because of its low signal interference, a conventional radio frequency (RF) transmitter can be used with an appropriate receiver in the airborne unit.

The handheld airborne unit 20 comprises a receiver 22, a microprocessor 24, a database 26, and a display 28. The receiver 22 automatically receives the wind conditions and the airfield ID. This can be accomplished by presetting the receiver 22 frequency to the ground station 2 frequency or by scanning pre-assigned frequencies (such as ATIS and ASOS assigned frequencies). The receiver 22 preferably uses low power, in the range of a few milli-watts. The microprocessor compares the received airfield ID with airfield IDs stored in the database 26 to identify the airfield. The microprocessor then uses the received wind conditions and runway information for that airfield stored in the database 26 to calculate the headwind and crosswind at each runway in both directions. To calculate the crosswind and headwind at each runway in both directions, the runway information in the database 26 only needs to store one direction for each runway. This is because the other direction can be obtained by adding or subtracting 180° from the given direction. After performing the headwind and crosswind calculations, the microprocessor determines a recommended runway for takeoff and landing operations of the aircraft based on the runway having the greatest calculated headwind value. The airfield ID, the wind conditions (wind speed, wind direction, and wind gust), and the recommended runway are displayed to the pilot on the display 28, preferably a backlight liquid crystal display (LCD). The recommended runway is preferably displayed as a two-digit number indicating the compass direction of the runway. For example, the number 18 indicates a north-south runway in the 180° direction and the number 36 indicates a north-south runway in the 360° direction. An additional character can be used to discriminate between left (L), right (R) and center (C) runways. Other characters may be used in foreign locations.

Figure 3:
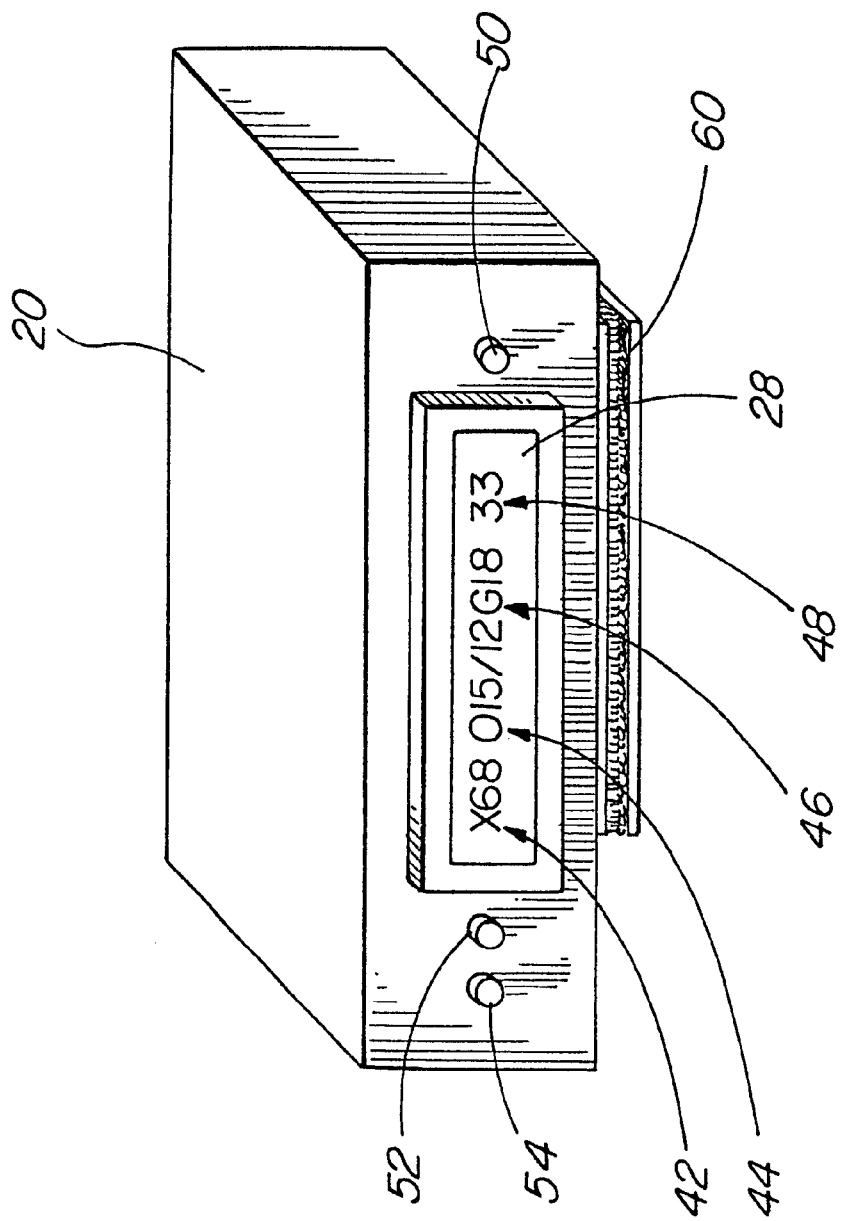
FIG. 3 shows the airborne unit 20 according to the present invention with the display 28 displaying the wind conditions at an airfield.

FIG. 3 shows the airborne unit 20 with the display 28 displaying the wind conditions at the airfield to the pilot. The displayed information includes the airfield ID 42, the velocity vector of the wind 44, the average wind velocity and peak gust 46, and the recommended runway 48 to the pilot.

The calculated wind conditions (headwind and crosswind) at the recommended runway can also be displayed on the display 28. To simplify the display 28, the airborne unit 20 can employ a display that only displays the wind conditions and the calculated wind conditions at the recommended runway one at a time. A crossing button 52 can be added to the airborne unit 20 to allow the pilot to switch between displaying the wind conditions and the calculated wind conditions on the display 28.

Figure 4:
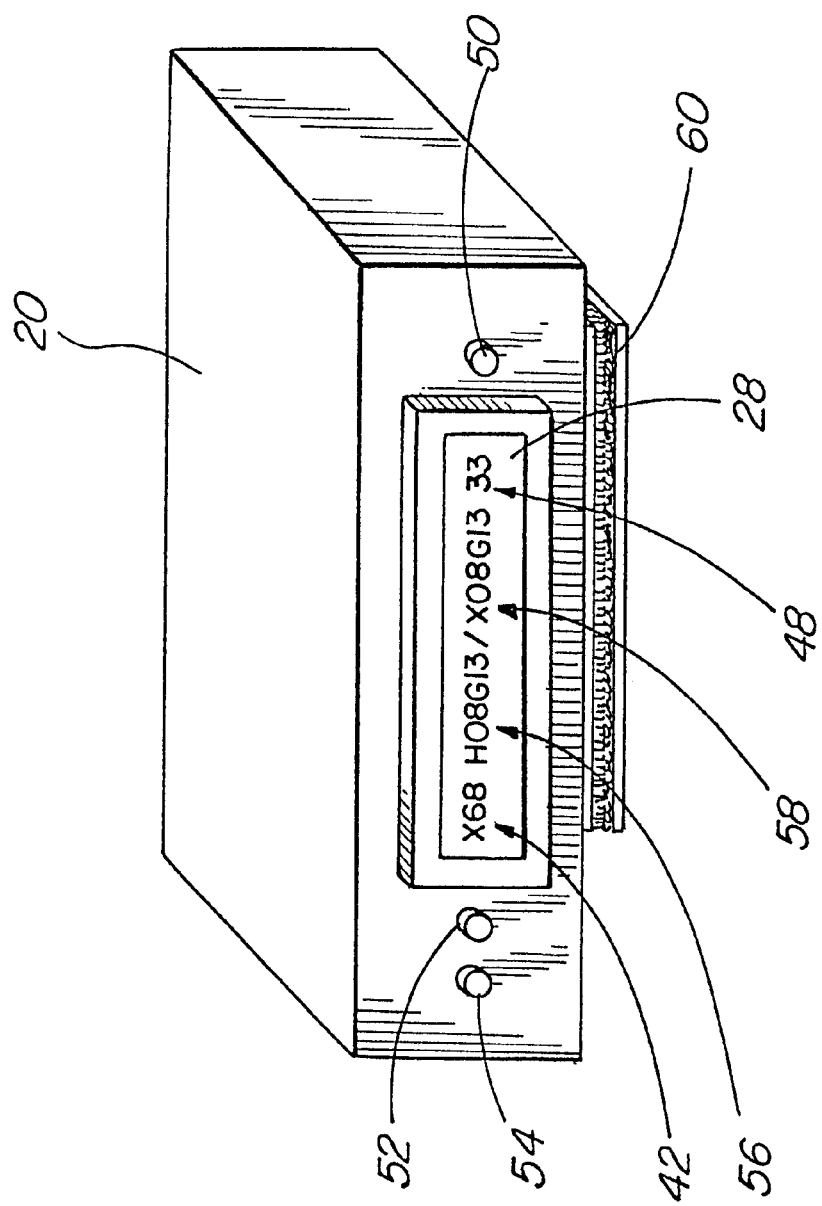
FIG. 4 shows the airborne unit 20 according to the present invention with the display 28 displaying the headwind and crosswind at a recommended runway.

FIG. 4 shows the airborne unit 20 with the display 28 displaying the calculated wind conditions (headwind and crosswind) at the recommended runway after the crossing button 55 has been pressed. The displayed information includes the airfield ID 42, headwind velocity and peak gust 56, crosswind velocity and peak gust 58, and the recommended runway to the pilot.

The handheld airborne 20 unit preferably has a small size, comparable in size to a cellular pocket pager. The small size allows the airborne unit 20 to be placed on the aircraft's instrument deck for easy viewing by the pilot. For easy attachment, the airborne unit can be placed on the instrument deck with a Velcro base 60.

The handheld airborne unit 20 is preferably powered by a battery, such as a rechargeable battery that can be recharged by a 12-volt cigarette lighter accessory plug in the aircraft. A low battery light 54 can be added to inform the pilot when the battery needs to be replaced or recharged. Also, an ON-OFF button 50 can be added to the airborne unit 20 to allow the pilot to manually turn the airborne unit 20 on and off.

To conserve power, the airborne unit 20 can have a standby mode. In this mode, the receiver 22 monitors for ground station transmissions while the microprocessor 24 and display 28 are turned off. When a ground station transmission is detected by the receiver 22, the airborne unit 20 automatically turns on the microprocessor 24 and the display 28. The standby mode can greatly extend battery life because the receiver 22 consumes much less power than the processor 24 and the display 28.

In the preferred embodiment, the ground stations at different airfields transmit at the same frequency so that the airborne 20 unit does not have to change frequency when the aircraft flies from one airfield to another airfield. In this case, the airborne unit 20 automatically captures and holds the strongest signal. As the aircraft flies out of range of one airfield, the airborne unit captures a next available strong signal.

The airborne unit can include a keypad 30 to allow the pilot to select a particular airfield ID. When an airfield ID is selected, the airborne unit 20 displays airfield IDs from detected ground station transmissions until the selected airfield ID is detected. When the selected airfield ID is detected, the airborne unit 20 displays the selected airfield ID and performs the headwind and crosswind calculations for the selected airfield ID.

The functions of the airborne unit can be performed by a wireless handheld computer, such as a "personal digital assistant" or an enhanced cellular telephone with an alpha-numeric or graphical display, or a sufficiently modified handheld GPS navigational receiver. To accomplish this, the wind conditions can be received by the wireless handheld computer's receiver. The database, including the stored airfield IDs and runway information, can be stored in the handheld computer's memory. The airfield ID identification, appropriate headwind and crosswind calculations and recommended runway determination can be performed using computer software down loaded into the handheld computer's memory. The airfield ID, the wind conditions (wind speed, wind direction, and wind gust), and the recommended runway can be displayed on the computer's display. For wireless handheld computers with graphics capability, the airfield diagram can be displayed as a "birds-eye-view" with the wind conditions displayed as a graphic vector symbol with the associated headwind and crosswind components. The headwind and crosswind can be displayed relative to the recommended runway, along with their digital values. The display orientation relative to the recommended runway can be either "North-up" or "Runway-up."

For a wireless handheld computer having a wireless internet link, the wind conditions can be received through the internet. In this embodiment, the ground station 2 is connected to the internet and transmits the wind conditions over the internet. An advantage of this embodiment is that the airfield information, including runway length changes, runway closure information, etc. can be regularly updated on the internet and down loaded into the wireless handheld computer.

Another benefit of connecting the ground station to the internet is that the wind conditions measured by the ground station can be used by other entities that wish to have real-time weather information. The other entities may include weather forecasters for weather status and forecasting, the military for training operations, agricultural firms for crop dusting, fertilizing, plowing and reaping, or other commercial ventures for any weather-related purpose.

In a further embodiment of the present invention, the ground station 2 includes a barometer 10, thermometer 12, and hygrometer 14, for monitoring the pressure, temperature and humidity at the airfield, respectively. The ground station 2 transmits the pressure, temperature, and humidity to the airborne unit 20. The airborne unit uses the received pressure, temperature, and humidity to calculate real-time density altitude. Using the calculated density altitude, aircraft information stored in the database 16, and aircraft weight manually entered on the keypad 30, the airborne unit can calculate takeoff and landing data, including takeoff and landing speeds and ground roll for the aircraft.

Therefore, the present invention is a cost-effective wind advisory system for providing real-time wind conditions at an airfield to a pilot. The present invention includes a self-contained ground station at the airfield for monitoring and transmitting wind conditions, and a small battery-powered airborne unit for receiving and displaying the wind conditions to the pilot. In addition to providing the pilot with the wind conditions, the airborne unit processes the wind conditions to calculate the headwind and crosswind at each runway in both directions at the airfield and provide a recommended runway to the pilot. A benefit of the present invention is the reduction in the average flight time for landing (about three to five minutes) by allowing the pilot to know the best approach-vector to take coming into the airfield and obviating the need to fly over the airfield first to visually acquire a windsock or other wind indicator to ascertain wind direction and speed. Also, the present invention results in an increase in flight safety by providing the pilot with real-time knowledge of crosswind conditions at the landing site. This information is especially useful when the pilot is landing at a non-controlled with no accurate wind data, or when a Unicom is unmanned.

Those skilled in the art will appreciate that various adaptations and modifications of the just-described preferred embodiment of the invention can be configured without departing from the scope and spirit of the invention. For example, the ground station can be adapted to store and transmit the runway information to the airborne unit. In addition, the present invention can be used at helopads (helicopter landing site) for the takeoff and landing operations of helicopters. This would be especially useful for commercial sites, hospitals and police stations that have a helopad. Therefore, it is to be understood that, within the scope of the appended claims, the invention may be practiced other than as specifically described herein.

What is claimed is:

1. A wind advisory system for aircraft, comprising:
   a ground station including a transmitter for transmitting wind conditions, including wind speed, wind direction and wind gust, at an airfield and an airfield ID; and
   an airborne unit adapted to be placed inside an aircraft comprising
      a receiver for receiving the wind conditions and the airfield ID from the ground station;
      a database for storing a plurality of stored airfield IDs and runway information for each stored airfield ID;
      a processor for identifying the airfield by comparing the received airfield ID with the stored airfield IDs in the database, calculating the headwind and crosswind at each runway at the airfield using the received wind conditions and the runway information for the stored airfield ID corresponding to the received airfield ID, and determining a recommended runway based on the runway having the greatest headwind value; and
      a display for displaying the received airfield ID, wind conditions, and the recommended runway.

2. The wind advisory system of claim 1, further comprising an anemometer for measuring the wind conditions at the airfield, and a second processor for encoding and reformatting the wind conditions and outputting the processed wind conditions to the transmitter.

3. The wind advisory system of claim 1, wherein the recommended runway is displayed as a two-digit number indicating the compass direction of the recommended runway.

4. The wind advisory system of claim 1, wherein the runway information stored in the database only stores one direction for each runway.

5. The wind advisory system of claim 1 further comprising an ON-OFF button for allowing a pilot to manually turn the airborne unit on and off.

6. The wind advisory system of claim 1, wherein the airborne unit has a standby mode in which the processor and display are turned off when the receiver monitors for ground station transmissions and the processor and display are turned on when the receiver detects a ground station transmission.

7. The wind advisory system of claim 1 further comprising a keypad for allowing a pilot to select an airfield ID, wherein the airborne unit performs the headwind and crosswind calculations when the receiver detects the selected airfield ID.

8. A wind advisory system for aircraft, comprising:
   a ground station for monitoring wind conditions, including wind direction, wind speed and wind gust, at an airfield and transmitting the wind conditions and an airfield ID; and
   a wireless handheld computer comprising
      a receiver for receiving the wind conditions and the airfield ID from the ground station;
      a computer memory for storing a plurality of stored airfield IDs, runway information for each stored airfield ID, and computer software having instructions for processing the received airfield ID and wind conditions;
      a processor for identifying the airfield by comparing the received airfield ID with the stored airfield IDs in the database, calculating the headwind and crosswind at each runway at the airfield using the received wind conditions and the runway information for the stored airfield ID corresponding to the received airfield ID, and determining a recommended runway based on the runway having the greatest headwind value according to the computer software instructions; and
      a display for displaying the received airfield ID, wind conditions, and the recommended runway.

9. The wind advisory system of claim 8, wherein the ground station transmits the airfield ID and wind conditions over the internet and the wireless handheld computer receiver receives the airfield ID and wind conditions using a wireless internet link.

10. The wind advisory system of claim 8, wherein the display displays the wind conditions as a graphic vector symbol with an associated headwind and crosswind component relative to the recommended runway.

11. A wind advisory system for aircraft, comprising:

a ground station for monitoring wind conditions comprising
- an anemometer for measuring the wind conditions, including wind speed, wind direction, and wind gust, at an airfield;
- a first processor for encoding and reformatting the wind conditions from the anemometer; and
- a transmitter for transmitting the wind conditions from the processor and the airfield ID; and an airborne unit adapted to be placed inside an aircraft comprising
- a receiver for receiving the wind conditions and the airfield ID from the ground station;
- a database for storing a plurality of stored airfield IDs and runway information for each stored airfield ID;
- a second processor for identifying the airfield by comparing the received airfield ID with the stored airfield IDs in the database, calculating the headwind and crosswind at each runway at the airfield using the received wind conditions and the runway information for the stored airfield ID corresponding to the received airfield ID, and determining a recommended runway based on the runway having the greatest headwind value; and
- a display for displaying the received airfield ID, wind conditions, and the recommended runway.

12. The wind advisory system of claim 11, wherein the transmitter is a spread spectrum transmitter.

13. The wind advisory system of claim 11, wherein the ground station is solar powered.

14. The wind advisory system of claim 11, wherein the ground station further comprises:

a barometer for measuring pressure;

a thermometer for measuring temperature; and a hygrometer for measuring humidity.

15. The wind advisory system of claim 14, wherein the ground station transmits the pressure, temperature, and humidity to the airborne unit, the database stores aircraft information, and the second processor calculates takeoff data, including liftoff airspeed, using the received pressure altitude, temperature, and humidity and the aircraft information stored in the database.

* * * * *